United States Patent
Dougherty et al.

(10) Patent No.: US 7,171,085 B2
(45) Date of Patent: Jan. 30, 2007

(54) POLARIZATION COMPENSATED OPTICAL TAP

(75) Inventors: David J. Dougherty, Mountain View, CA (US); Pang-Chen Sun, San Diego, CA (US); Duncan W. Harwood, Santa Clara, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 126 days.

(21) Appl. No.: 10/629,143

(22) Filed: Jul. 29, 2003

(65) Prior Publication Data

US 2005/0025427 A1    Feb. 3, 2005

(51) Int. Cl.
*G02B 6/26* (2006.01)
*G02B 6/00* (2006.01)

(52) U.S. Cl. .............. 385/48; 385/11; 385/42
(58) Field of Classification Search .......... 385/27, 385/28, 31, 32, 39, 41, 42, 48
See application file for complete search history.

(56) References Cited

U.S. PATENT DOCUMENTS

| | | | |
|---|---|---|---|
| 4,291,940 A | 9/1981 | Kawasaki et al. | |
| 4,779,945 A | 10/1988 | Hill et al. | |
| 4,900,119 A | 2/1990 | Hill et al. | |
| 4,983,006 A * | 1/1991 | Nishimoto | 385/16 |
| 5,004,316 A | 4/1991 | Hill et al. | |
| 5,054,874 A | 10/1991 | Hill et al. | |
| 5,539,850 A * | 7/1996 | Henry et al. | 385/48 |
| 5,838,844 A * | 11/1998 | Van Dam et al. | 385/14 |
| 6,522,822 B2 * | 2/2003 | Huang et al. | 385/132 |
| 6,636,669 B1 * | 10/2003 | Chin et al. | 385/42 |
| 6,807,004 B2 | 10/2004 | Carver | 359/487 |
| 6,885,795 B1 * | 4/2005 | Hsu et al. | 385/48 |
| 6,915,047 B1 * | 7/2005 | Mekis et al. | 385/48 |

OTHER PUBLICATIONS

Rajarajan et al, Novel Polarization-Independent Optical Bends for Compact Photonic Integrated Circuits, 1999, SBMO/IEEE MTT-S IMOC, pp. 462-464.*
Song et al, Scalar BPM Analyses of TE and TM Polarized Fields in Bent Waveguides, IEEE Transactions on Antennas and Propagation, vol. 51, No. 6, Jun. 2003, pp. 1185-1198.*
Marcatili, "Bends in optical dielectric guides", Bell Syst. Tech. J., vol. 48, Sep. 1969, pp. 2103-2132.

* cited by examiner

*Primary Examiner*—Sung Pak
(74) *Attorney, Agent, or Firm*—Allen, Dyer, Doppelt, Milbrath & Gilchrist, P.A.

(57) ABSTRACT

A polarization compensated planar waveguide branch is disclosed having a planar optical trunk waveguide for transporting a linearly un-polarized optical signal having TE and TM modes. A planar optical branch waveguide, capable of supporting TE and TM modes is optically coupled to the trunk waveguide such that at least a portion of an optical signal propagating within the trunk waveguide will couple into the branch waveguide with an undesired imbalance, having stronger TM mode coupling than TE mode coupling for the at least the portion of the optical signal which couples into the branch waveguide from the trunk waveguide. A portion of said branch waveguide downstream from a region where coupling takes place between the trunk and branch waveguides or a waveguide portion optically coupled thereto, receives the at least a portion of the optical signal, and has at least a predetermined bend with a predetermined radius for compensating for the unwanted imbalance in the TM and TE mode caused by light optically coupling into the branch from the trunk waveguide.

9 Claims, 11 Drawing Sheets

Conventional directional coupler

FIG. 3b

Compensating bend

Overall tap

POLARIZATION COMPENSATED OPTICAL TAP

FIELD OF THE INVENTION

This invention relates to an optical waveguide tap, which is comprised of a waveguide coupler, followed by a waveguide bend that subjects tapped light passing therethrough from the waveguide coupler to polarization dependent loss, that is effectively complementary to and thereby compensates for polarization dependent loss introduced into the tapped light by the waveguide coupler, so that the result of combining the waveguide coupler with the waveguide bend is to produce substantially no resultant or net polarization dependent loss from an input end to an output tap end of the optical waveguide tap.

BACKGROUND OF THE INVENTION

Optical taps are used in many optical networks in such applications as power balancing, signal monitoring or feedback control for amplification or attenuation purposes. An optical tap operates by diverting or 'tapping' a small, predetermined portion of the signal power that can then be measured to determine the power in the main signal without appreciably attenuating that signal. Although optical taps are typically used to tap a small portion of an input signal, they may tap more than 50% of an input signal.

The requirements to an optical tap are generally low insertion loss for the signal channel and minimal wavelength dependent loss (WDL) and polarization dependent loss (PDL) for the tapped channel.

Polarization dependent loss is defined to be a measure of peak-to-peak difference in transmission of an optical component or system with respect to all possible states of polarization. It is the ratio of the maximum and the minimum of all possible states of transmission of an optical device with respect to all polarization states.

PDLdb=10*Log (Pmax/Pmin)

By way of example, a specification for an optical tap is:

| | |
|---|---|
| i. Insertion loss (Signal Channel) | <0.2 dB |
| ii. PDL (tap channel) | <0.2 dB |
| iii. Wavelength uniformity (tap channel) | <0.2 dB |
| iv. Tap ratio | 2–5% |

Figure 1:
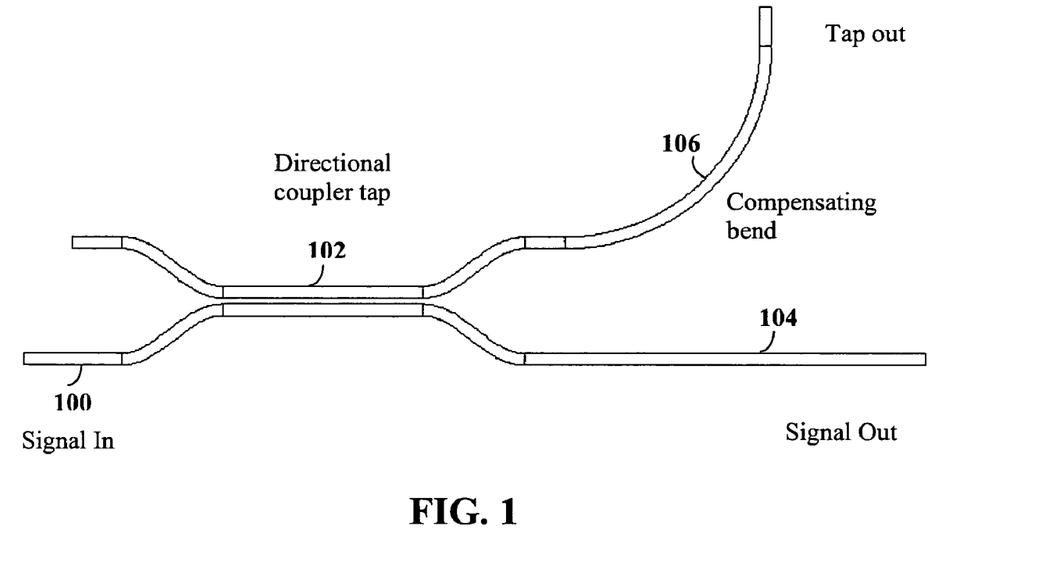
FIG. 1 is a diagram of a directional coupler in accordance with an embodiment of this invention.
Figure 1A:
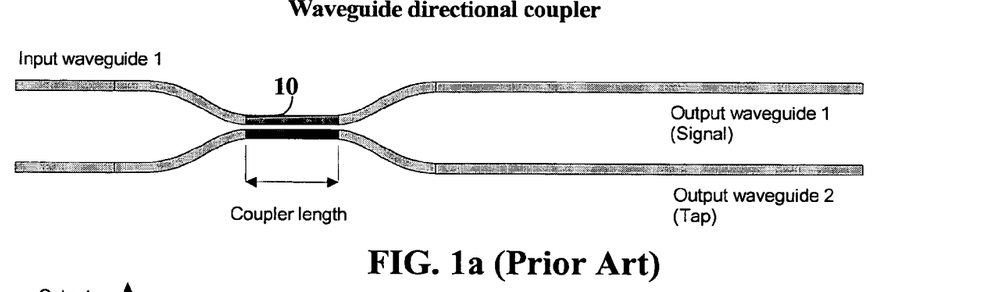
FIG. 1a is a diagram of a prior art directional coupler.

One of the most common approaches to producing an optical tap in waveguide devices is using a directional coupler 10 as shown in FIG. 1a.

Figure 1B:
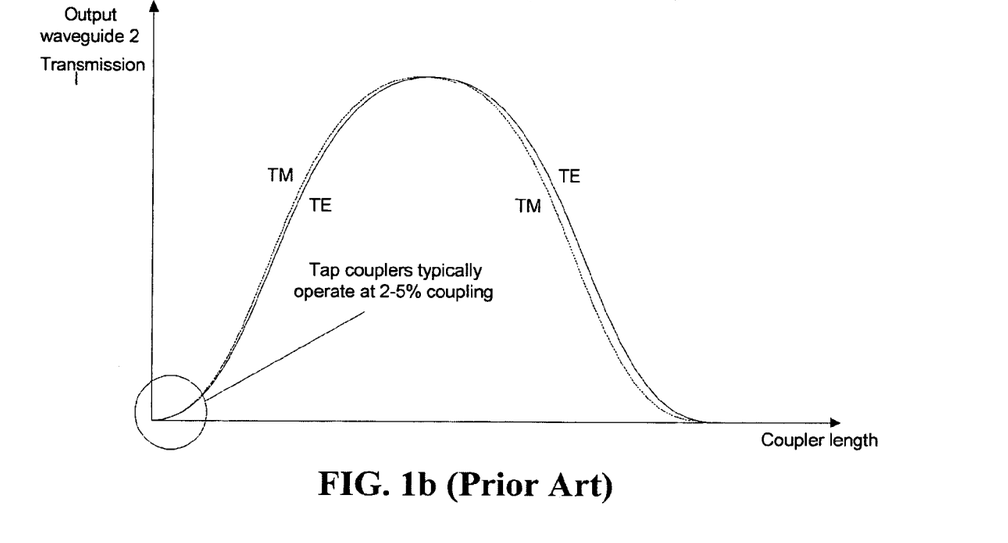
FIG. 1b is a graph of the response of the prior art directional coupler depicting transmission from the input to the second waveguide output versus coupler length.

The operation of a directional coupler is based on coupled mode theory and is well described in the literature. Directional couplers have been disclosed by Derwyn C. Johnson and Kenneth O. Hill in U.S. Pat. Nos. 4,291,940, 4,779,945, 4,900,119, 5,004,316, and 5,054,874 incorporated herein by reference. In essence, two waveguides are brought into close proximity for a predetermined length such that light from one of the waveguides couples to the adjacent waveguide. The amount of light which couples into the adjacent waveguide is determined by several factors including but not exclusive to the refractive index profile of the waveguides, the separation of the waveguides and the length of the coupling region. The plot of FIG. 1b shows the dependence of the coupling efficiency from waveguide 1 to waveguide 2 as a function of the coupling length for both polarization modes. The coupling is sinusoidal with the coupling length, with slightly different periods for the two polarizations Coupled mode theory determines that the coupling between waveguides will obey a sinusoidal dependence on directional coupler length as indicated in FIG. 1b.

The directional coupler 10 provides a suitable building block for an optical tap since, for a given design, adjusting the length of the coupler can be used to change the amount of light which is coupled or 'tapped' from the main signal waveguide. The excess loss of directional couplers is usually very low and so the requirements of low insertion loss on the signal channel and accurate control of the tap ratio can be achieved. However, for silica-on-silicon based optical taps, that is, waveguide devices that comprise doped silica overlying a silicon substrate, low tap PDL is difficult to achieve.

For all-silica optical fiber based taps, the thermal expansion mismatch between the core and cladding material is low (typically <0.5 ppm). Although fiber drawing is a high temperature process, the low coefficient of thermal expansion (CTE) mismatch means that thermal stresses generated in the materials are small with respect to planar silica-on-silicon devices and so stress induced birefringence is equally small in such optical fiber. In contrast, silica-on-silicon devices such as planar waveguides have very large CTE mismatches between core, cladding, and substrate materials resulting from the common necessity to deposit final overcladding layers with a much lower softening temperature than the already etched core layers. Thermal stresses are induced in the device during processing which lead to stress induced birefringence in the waveguiding region. The polarization dependence of directional coupler based taps is well known to be caused by stress induced birefringence leading to a difference in coupling lengths for the two polarizations (PDCR—polarization dependent coupling ratio). Coupling of TM modes is enhanced leading to a shorter coupling length for the TM polarization as shown in FIG. 1b, which schematically indicates the sinusoidal variation of power in the two waveguides as a function of the coupling region length. The difference in coupling strength means that the TE curve is stretched in the length axis with respect to the TM curve. Even though the tap is designed for very small coupling ratios, the real data shows that the PDL resulting from PDCR is still at an unacceptable level even for a tap ratio of −15 dB.

Figure 2:
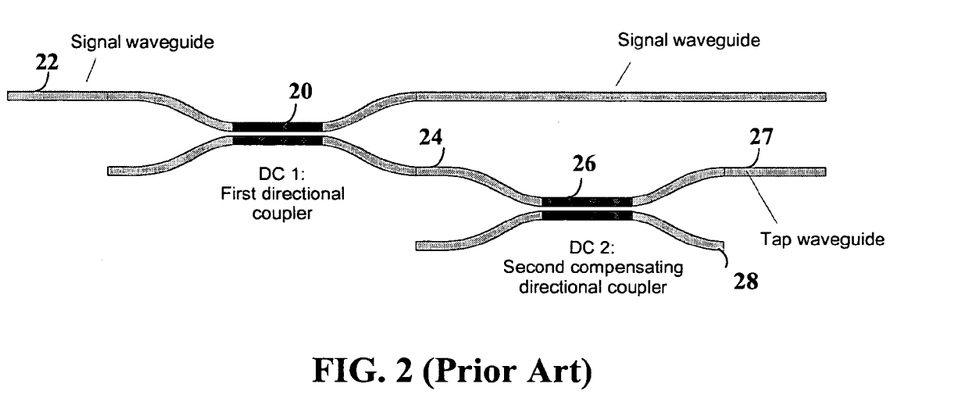
FIG. 2 is a diagram of a prior-art polarization independent tap, having two directional couplers with distinct coupling ratios such that the polarization dependence of the first coupler is compensated by the opposite polarization dependence of the second coupler.

For silica-on-silicon devices one of the methods to achieve a polarization independent tap function is to compensate for the imbalance or higher coupling ratio of TM mode in the tapped output of the directional coupler using additional waveguide devices with opposite optical characteristics, for example providing high loss for TM mode. Such a scheme is disclosed in U.S. Pat. No. 5,539,850 in the names of Henry et al., where compensation was achieved using a second directional coupler that again preferentially couples the TM mode. This configuration is shown in FIG. 2 where a first directional coupler 20 having an input trunk waveguide 22 is coupled to a first branch arm 24 which itself serves as a trunk arm from which a second compensating coupler 26 is disposed to couple into an unused branch 28. The tap waveguide 27 has an output that is compensated. Typically, this compensation is accomplished by choosing a short and a long coupling length such that the transmissions are on opposites sides of a sinusoidal peak as in FIG. 1b, where the differences in transmission with polarization are of opposite signs.

It is an object of this invention to provide a relatively inexpensive, combination of waveguide coupler and bend components that make up an optical tap, said bend component being operative to substantially compensate for polarization dependent loss that the tap would otherwise have suffered between its input and output ports, absent the bend component.

SUMMARY OF INVENTION

In accordance with an aspect of this invention there is provided, a planar optical waveguide tap, in which polarization dependent loss is substantially compensated from an input end to an output end, comprises:

a first optical waveguide for supporting a first polarization mode and a second polarization mode when light is launched into the input end of said waveguide;

a second optical waveguide having at least a coupling portion adjacent and proximate to the first optical waveguide for receiving a portion of light launched into the first optical waveguide into the second optical waveguide, said coupling portion coupling light in a substantially polarization dependent manner, such that a first polarization mode couples significantly more strongly than a second polarization mode into the second optical waveguide from the first optical waveguide, so that light of the second polarization received into the second optical waveguide from the first optical waveguide experiences higher optical loss through said coupling portion than light of said first polarization; and a bend portion of the second optical waveguide distinct from the coupling portion and being positioned between the coupling portion and the output end, and having at least one predetermined bend therein for transmitting light therethrough in a substantially polarization dependent manner, so that light of the first polarization mode radiates out of the bend portion of the waveguide into a cladding about the bend portion with greater efficiency, and thereby experiences higher optical loss in the bend, than light of the second polarization mode, so as to substantially compensate for a polarization denendent loss that occurs from the coupling portion, for light which remains with the second optical waveguide after passing through the bend portion.

In accordance with the invention there is further provided, a planar optical waveguide system, including a first optical waveguide for supporting a first polarization mode and a second polarization mode and having a second optical waveguide including at least a coupling portion adjacent and proximate to the first optical waveguide for tapping a portion of light launched into the first optical waveguide into the second optical waveguide, wherein in operation, the first polarization mode of the light that has coupled into the second optical waveguide from the first optical waveguide experiences an insertion loss $I_{11}$, substantially less than the insertion loss, $I_{12}$, of light in the second polarization mode coupled into the second optical waveguide, wherein an insertion loss difference $I_A = I_{21} - I_{11}$, with $I_A > 0$, exists, the improvement comprising:

a portion of the second optical waveguide having at least one bend therein, a respective bend causing light in the first polarization mode to radiate out a core of said respective bend with greater efficiency, and thereby experience higher optical loss in the respective bend, than light in the second polarization mode, so as to substantially compensate for the insertion loss difference $I_A$ for light coupled from the first optical waveguide to the second optical waveguide after passing through the respective bend thereof.

In accordance with the invention there is further provided a polarization compensated planar waveguide branch comprising:

a planar optical trunk waveguide for transporting an optical signal having TE and TM modes;

a planar optical branch waveguide, capable of supporting TE and TM modes optically coupled to the trunk waveguide such that at least a portion of the optical signal propagating within the trunk waveguide will couple into the branch waveguide with a coupling imbalance between the TE and TM modes, causing stronger TM mode coupling than TE mode coupling, and thereby higher optical loss for the TE mode than for the TM mode, for the at least a portion of the optical signal which couples into the branch waveguide from the trunk waveguide; wherein a portion of said branch waveguide, or a waveguide portion optically downstream from a region where coupling takes place between the trunk and branch waveguides, or a waveguide portion optically coupled thereto, and receiving the at least a portion of the optical signal, has a predetermined bend with a predetermined radius for transmitting light therethrough in a substantially polarization dependent manner, so as to cause higher optical loss in the predetermined bend for the TM mode than for the TE mode, thereby compensating for the coupling imbalance between the TM and TE modes.

In accordance with a further feature of the invention, there is provided a chip for transporting a plurality of optical signals having a plurality of separate trunk waveguides within the same or common substrate, each having a branch waveguide optically coupled thereto by separate coupling regions, each coupling region exhibiting an imbalance in TE and TM mode coupling, thereby inducing polarization dependent loss for light coupled from each trunk to a respective branch waveguide. The chip has the following improvement;

each branch waveguide includes a waveguide region that is downstream from said coupling region, the waveguide region having at least a predetermined bend therein, for transmitting light therethrough in a substantially polarization dependent manner, and offsetting and compensating for said imbalance in TE and TM mode coupling, to realize light transmission from the trunk waveguide to the branch waveguide passing through the bend with a substantially reduced resultant or net polarization dependent loss.

BRIEF DESCRIPTION OF THE DRAWINGS

Exemplary embodiments of the invention will now be described in conjunction with the drawings in which.

DETAILED DESCRIPTION

Referring now to FIG. 1, a waveguide circuit a circuit is shown which conveniently and inexpensively compensates for the polarization dependence of a tap for a silica-on-silicon waveguide device. An input port 102 is optically couple by way of a directional coupler 100 to an output branch arm 104. The low PDL tap function is achieved through the use of a small radii bend 106 on the tapped or branch arm. The same phenomenon that causes the TM polarization to more readily couple between waveguides in a directional coupler also causes a higher polarization dependent bend loss for small radius bends.

In essence, the TM mode is less well confined so that it both couples between waveguides more easily and radiates from bends more readily than TE modes.

Figure 3A:
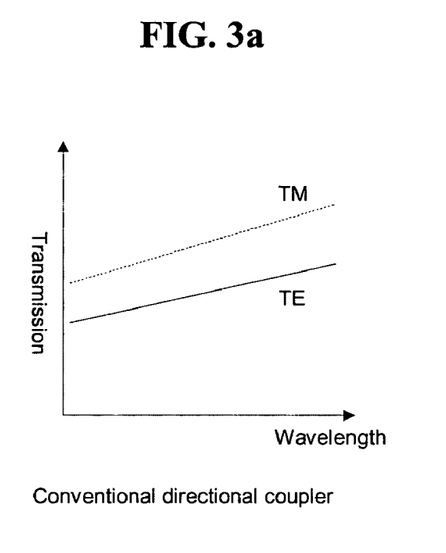
FIGS. 3a, 3b, and 3c are graphs demonstrating how the wavelength dependence of the tap can be compensated, along with the polarization dependence, by use of a compensating waveguide bend downstream from the tap.
Figure 3B:
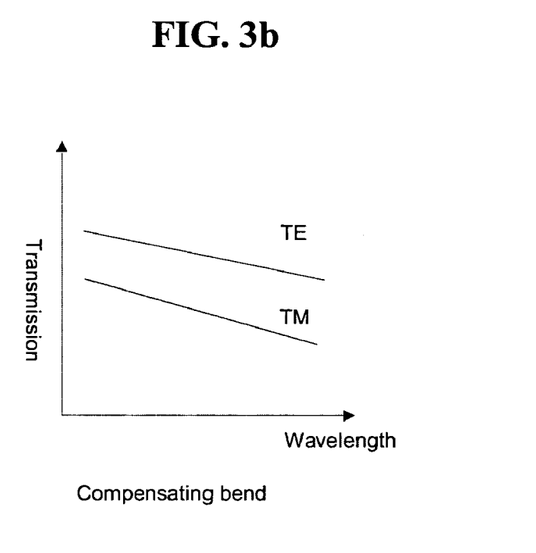
Figure 3C:
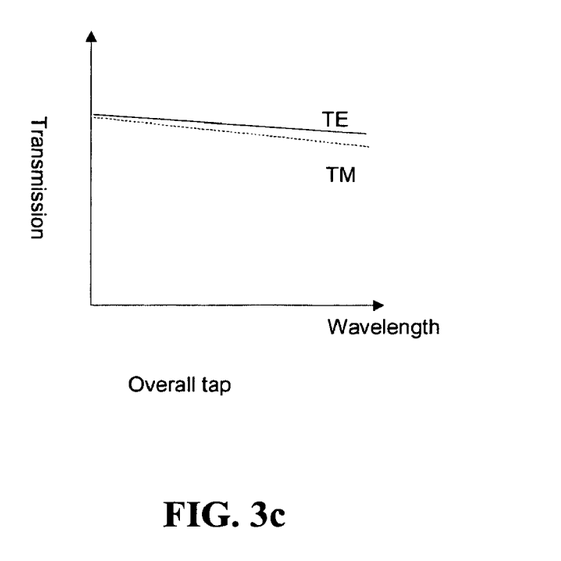

Because TM modes couple more strongly to the tap or branch waveguide from a trunk waveguide, the tapped power level within the branch is slightly higher for the TM polarization than TE. This is illustrated in FIG. 3a showing input-tap transmission. By adding a small radius bend to the tapped waveguide, an additional loss can be introduced which is higher for the TM polarization shown in FIG. 3b, and thereby compensates for the PDL induced by the directional coupler. Of course it would be possible to optically couple a compensating waveguide having a predetermined bend therein to the output end of the tap waveguide instead of bending a portion of the tap waveguide itself. In general, changes to the material composition or waveguide dimension that influence the PDL of the directional coupler portion of the design similarly impacts the polarization dependence of the bend loss making the design robust to manufacturing variability. In the same manner that polarization dependence can be minimized through the bend compensation design, wavelength uniformity can also be improved. Longer wavelengths couple more strongly in the directional coupler but are also radiated more quickly from the compensating bend. The result is a reduction in wavelength dependence of the bend compensated tap (BCT) with respect to standard single stage directional coupler based taps. By choosing the appropriate bend radius, both the PDL and wavelength tilt of the first directional coupler can be reduced as is shown in FIG. 3c.

The key element in this invention is the use of a small bend radius curved waveguide inserted in a path downstream from the tap. The compensating bend design for typical tap ratios in the 1% to 10% range, uses a radius between 2 and 3 mm and a 90-degree total bend which may or may not occur in one continuous arc. Use of such a small radius bend in 0.7% to 0.8% delta waveguides is a novel design improvement. Standard design rules for 0.7% to 0.8% silica on silicon processes limit the minimum bend radius to >4.5 mm in order to avoid excessive optical loss. Although small radius bends do have high loss, for example, 2 dB, this is not crucial for a tap, as the directional coupler tap ratio can be adjusted to give the desired, overall tap ratio. Because of this high loss, waveguide designs using small bend radii downstream from a tap would only be used for PDL and wavelength dependence compensation of the tap. The simplicity, repeatability and reliability of this design compared to other compensating structures is highly advantageous.

Figure 4:
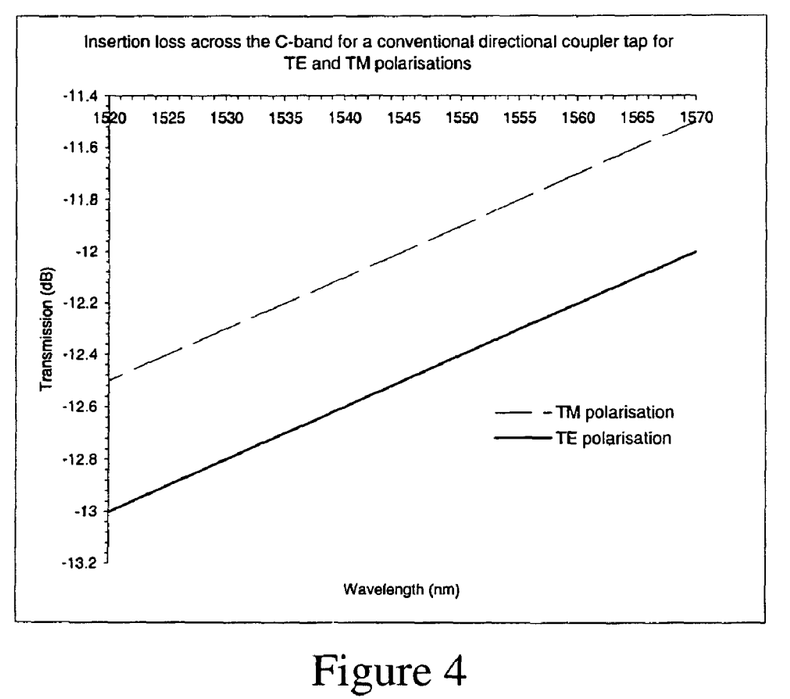
FIG. 4 is a plot of Transmission versus wavelength illustrating insertion loss across the C-band for a conventional directional coupler tap for TE and TM polarizations.

FIG. 4 illustrates wavelength dependence of transmission through a directional coupler tap realized in 0.8% refractive index delta silica-on-silicon waveguides with Sum by 5 um core dimensions. The transmissions for the two polarization modes (TM and TE) of the guide are shown. Transmission for the TM mode is higher, indicating relatively more TM light is coupled to the tap guide than TE light for equal input powers in each mode.

Figure 5:
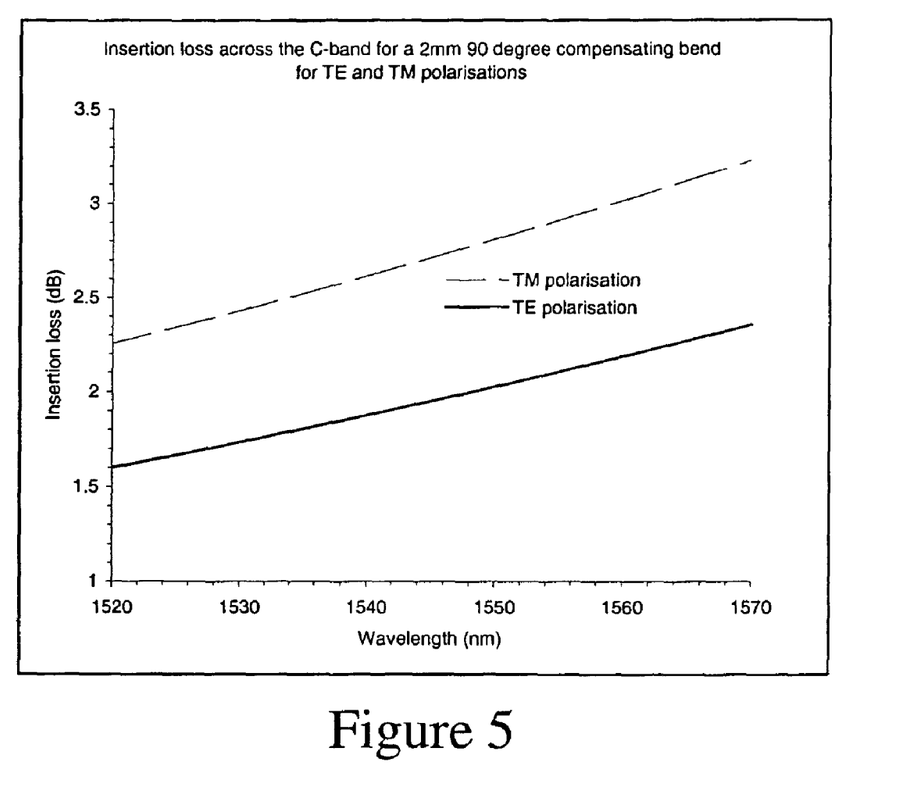
FIG. 5 is a plot of Transmission versus wavelength for the directional coupler of FIG. 4 including the inventive aspect of inserting a predetermined bend with the coupler branch.
Figure 6:
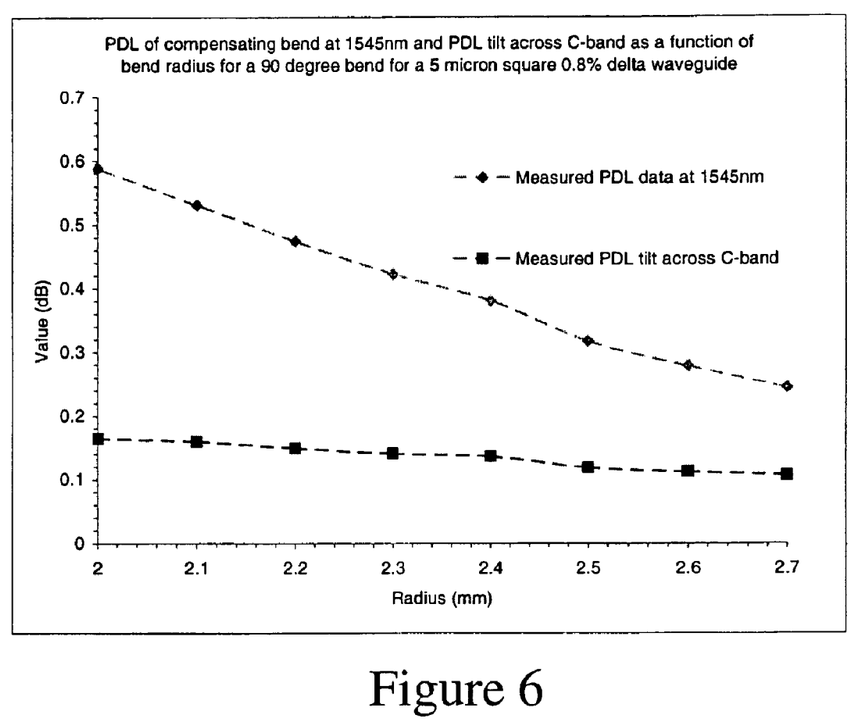
FIG. 6 is a graph depicting measured polarization dependent loss (PDL) of a silica waveguide having a 90 degree bend as a function of radius where the light gray plot indicates PDL measured at wavelength of 1545 nm; and the darker plot illustrates PDL spectral tilt across the C-wavelength band, where, PDL tilt is defined as PDL at 1570 nm minus the PDL at 1520 nm.
Figure 7:
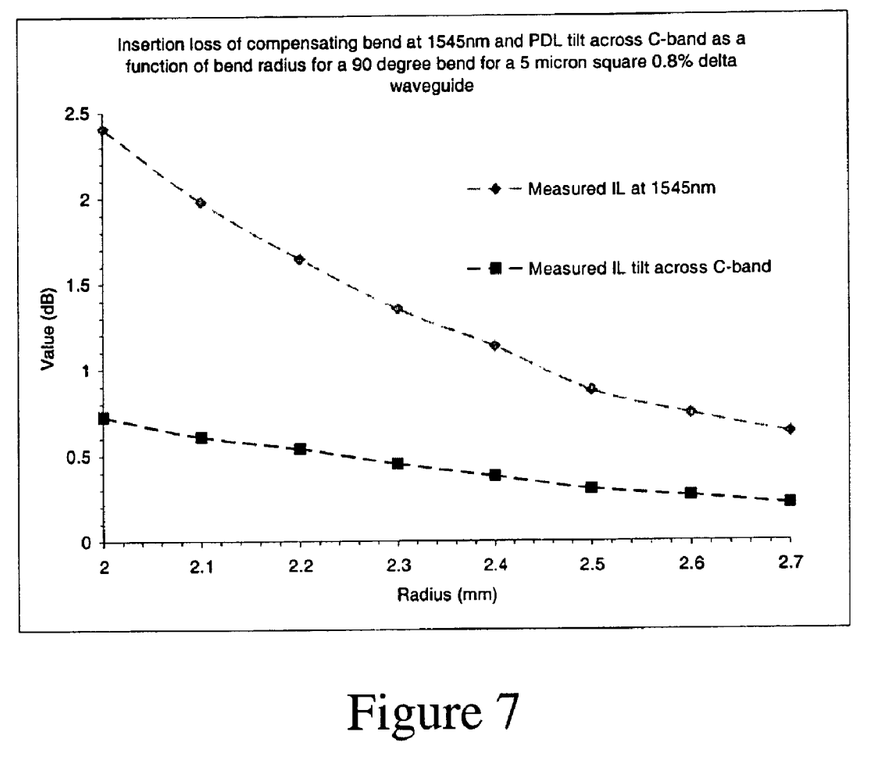
FIG. 7 is a graph depicting measured Insertion Loss (IL) of a silica waveguide 90 degree bend as a function of bend radius wherein the light gray plot shows IL measured at wavelength of 1545 nm and the darker plot shows IL spectral tilt across the C-wavelength band. IL tilt is defined as IL at 1570 nm minus the IL at 1520 nm.

FIG. 5 illustrates that providing a 2 mm radius bend through 90 degrees for the same waveguide as used in FIG. 4, the TM mode experiences greater loss due to radiation out from the guide than the TE mode in propagating around the bend. If a tap is more efficient for TM, this bend can provide compensation for the coupling imbalance between the TE and TM modes produced by the directional coupler, so as to equalize overall the tap coupling ratios for TE and TM modes.

Small bend radius compensators also benefit arrays of integrated devices in an elegant way. Typical arrays of devices (such as VOAs) are arranged with their optical paths parallel to each other, and traveling from one edge of the chip to the other. The device waveguides are spaced at a pitch determined be either the device characteristics (e.g. VOA thermal crosstalk) or the pitch of the mating fiber ribbon array at either edge on the chip. Often the waveguide pitch will vary across the chip. Tapped waveguides from devices in the center of the array must be brought to the chip edge, for fiber connection or to illuminate edge-mounted or flip-chip top-mounted mounted detectors. This can be done either by crossing neighboring guides, denoted crossing taps, or by remaining parallel to the array, called interdigitated taps.

Figure 8A:
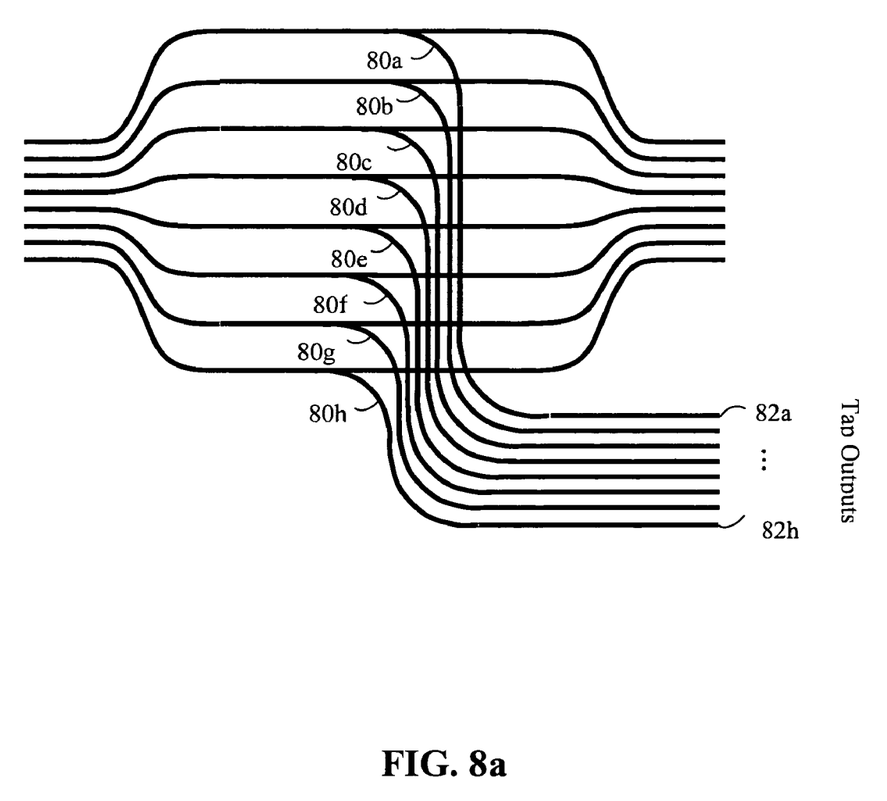
FIGS. 8a and 8b are waveguide diagrams illustrating a crossing tap layout for a waveguide array and one where the taps are disposed between adjacent guides.

Small radius bend compensators benefit crossing taps by allowing a smaller device to device pitch. Low (0.7% to 8%) delta waveguides must cross at >45 degrees to avoid high losses and crosstalk. To cross many guides, a crossing angle of 90 is often necessary to not induce excessive losses and the device waveguides. The small bend radius of 2 to 3 mm allows the first waveguide crossing to be at a larger angle for a given pitch as shown in FIG. 8a. This enables higher levels of integration, which is a key path to cost reduction in integrated components. Crossing allows bringing the taps 80a through 80h from each waveguide to the edge of the chip where they can be separately coupled to fibers or detectors at locations 82a through 82h, the tap waveguides must cross the signal waveguides. The signal guides must be spaced far enough apart to allow the adjacent taps to cross at an angle great enough to prevent optical crosstalk or coupling. The use of small bend radius PDL compensators facilitates this because it allows closer spacing of the signal guides for the same crossing angle restriction.

Figure 8B:
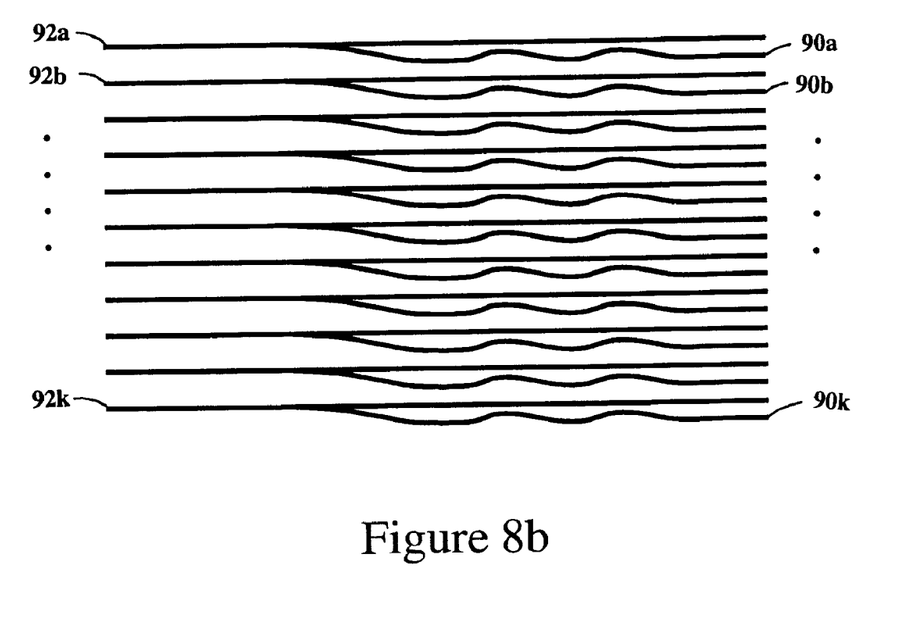

For interdigitated taps, illustrated in FIG. 8b where 11 waveguides and 11 taps are provided each tap channel 90a through 90k follows alongside the corresponding signal channel 92a through 92k; the output channels are interleaved to separate the signals and taps. The PDL compensation bend structure of taps is arranged differently than that for the crossing taps. The bend structure for the interdigitated taps can be in a 'snake-shape' bend structure consisting of tight bend radii bends as shown in FIG. 8b, where the purpose of the bends are identical, i.e., to produce higher loss for the TM mode. If the taps are to be brought to the edge of the chip with the signal guides, the compensating bend arc can be broken into a series of opposite direction bends.

Both PDL and WDL of a tap can be compensated for a stand-alone chip by adjusting the downstream bend and process condition simultaneously (i.e., overcladding coefficient of thermal expansion (CTE)) to achieve the best optical performance.

Figure 9A:
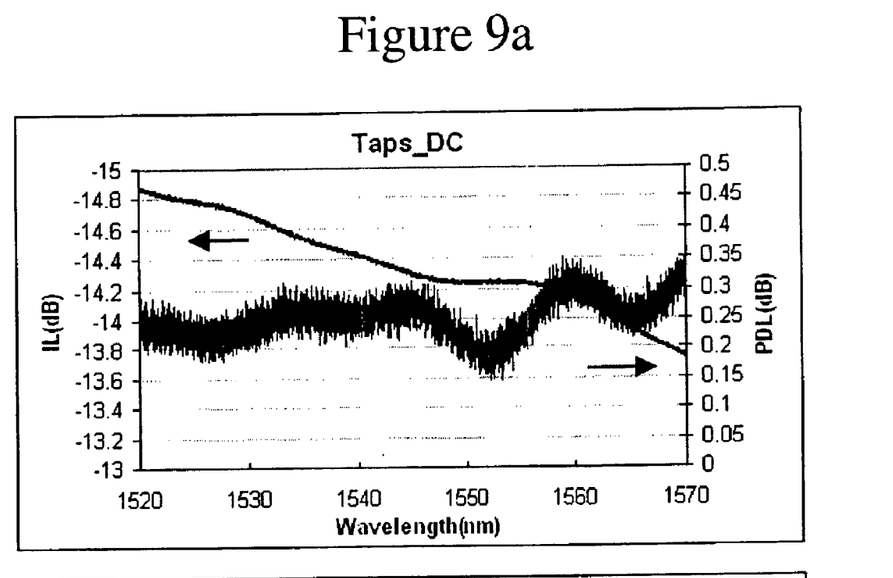
FIG. 9a illustrates PDL tap compensation. Top Plot: Measured IL IL (left axis, dark curve) and (PDL right axis, light curve) of a nominal 4% waveguide tap directional coupler.
Figure 9B:
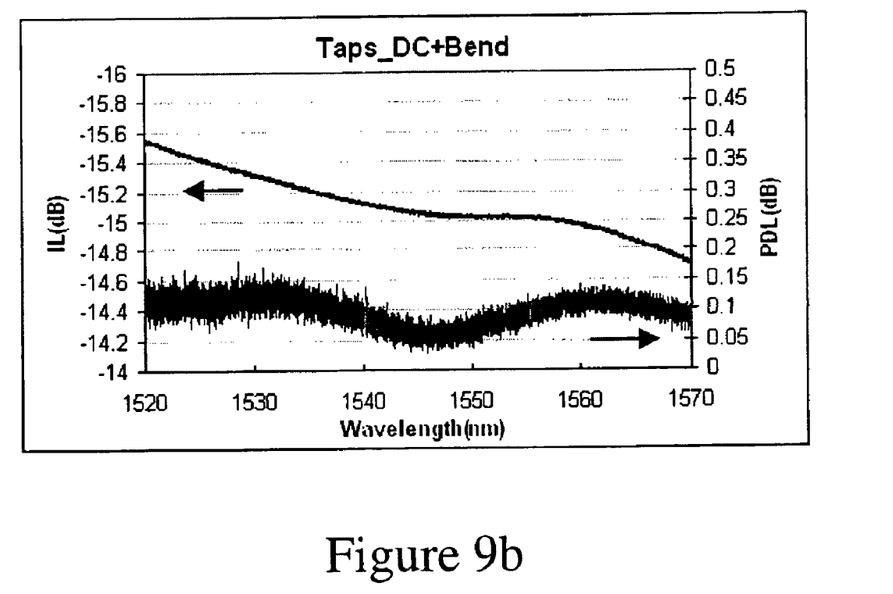
FIG. 9b illustrates PDL improvement from 0.35 dB (max) to less than 0.15 dB (max) across the 1520 nm to 1570 nm wavelength band.

FIGS. 9a and 9b show the PDL of Taps with (a) directional coupler only and (b) directional coupler plus bend, that clearly indicate the improvement of the PDL and, to certain extent, WDL via the bend.

Numerous other embodiments may be envisaged, without departing from the spirit and scope of the invention.

What is claimed is:

1. A planar optical waveguide tap, in which polarization-dependent loss is substantially compensated from an input end to an output end, comprising:
   a first optical waveguide for supporting a first polarization mode and a second polarization mode when light is launched into the input end of said waveguide;
   a second optical waveguide having at least a coupling portion adjacent and proximate to the first optical waveguide for receiving a portion of light launched into the first optical waveguide into the second optical waveguide, said coupling portion coupling light in a first, substantially polarization-dependent manner, such that the first polarization mode couples significantly more strongly than the second polarization mode into the second optical waveguide from the first optical waveguide, so that light of the second polarization received into the second optical waveguide from the first optical waveguide experiences higher optical loss through said coupling portion than light of said first polarization mode; and,
   a bend portion of the second optical waveguide distinct from the coupling portion and positioned between the coupling portion and the output end, said bend portion having at least one predetermined bend therein having a prescribed size and shape that are effective to cause light to be transmitted through said band portion in a second substantially polarization-dependent manner, that is opposite to the said first, substantially polarization-dependent manner, so that the second polarization mode couples through said band portion significantly more strongly than the first polarization, whereby light of the first polarization mode radiates out of the bend portion of the waveguide into a cladding about the bend portion with greater efficiency, and therefore experiences higher optical loss in the bend, than light of the second polarization mode, so as to substantially compensate for a polarization-dependent loss that occurs from the coupling portion, for light which remains with the second optical waveguide after passing through the bend portion.

2. A planar optical waveguide system, including a first optical waveguide for supporting a first polarization mode and a second polarization mode and having a second optical waveguide including at least a coupling portion adjacent and proximate to the first optical waveguide for tapping a portion of light launched into the first optical waveguide into the second optical waveguide, in a first, substantially polarization-dependent manner, such that the first polarization mode of the light that has coupled into the second optical waveguide from the first optical waveguide experiences a first insertion loss $I_{11}$, substantially less than a second insertion loss, $I_{12}$, of light in the second polarization mode coupled into the second optical waveguide, resulting in an insertion loss difference $I_A = I_{21} - I_{11}$, with $I_A > 0$, the improvement comprising:
   a portion of the second optical waveguide includes at least one bend therein having a prescribed size and shape that are effective to cause light to be transmitted through said bend in a second, substantially polarization-dependent manner, that is opposite to said first, substantially polarization-dependent manner and causes light in the first polarization mode to undergo higher optical loss in said at least one bend, than light in the second polarization mode, so as to substantially compensate for the insertion loss difference $I_A$ for light coupled from the first optical waveguide to the second optical waveguide after passing through said at least one.

3. A polarization compensated planar waveguide branch comprising;
   a planar optical trunk waveguide for transporting an optical signal having TE and TM modes, said planar optical trunk waveguide comprising silica disposed over a silicon substrate; and
   a planar optical branch waveguide comprising silica disposed over said silicon substrate, said planar optical branch waveguide being capable of supporting TE and TM modes, and being optically coupled to the trunk waveguide, such that at least a portion of an optical signal propagating within the trunk waveguide will couple into the branch waveguide with a coupling imbalance between said TE and TM modes, causing stronger TM mode coupling than TE mode coupling, and thereby higher optical loss for the TE mode than for the TM mode, for the at least the portion of the optical signal which couples into the branch waveguide from the trunk waveguide;
   wherein a portion of said branch waveguide downstream from a region where coupling takes place between the trunk and branch waveguides, or a waveguide portion optically coupled thereto for receiving the at least a portion of the optical signal, has a predetermined bend with a predetermined radius from 2 mm to 3 mm having a prescribed size and shape that are effective to cause light to be transmitted through said bend in a substantially polarization-dependent manner, that is opposite to said coupling imbalance for the at least the portion of the optical signal which couples into the branch waveguide from the trunk waveguide, and causes higher optical loss in the predetermined bend for the TM mode than for the TE mode, thereby compensating for said coupling imbalance between said TE and TM modes.

4. In a chip for transporting a plurality of optical signals having a plurality of separate trunk waveguides within a common substrate, each having a branch waveguide optically coupled thereto by a separate coupling regions, each coupling region exhibiting an imbalance in TE and TM mode coupling, thereby inducing a polarization-dependent loss for light coupled from each trunk to a respective branch waveguide, the improvement comprising;

each branch waveguide includes a waveguide region that is downstream from said coupling region, said waveguide region having at least a predetermined bend therein, having a prescribed size and shape that are effective to cause light to be transmitted through said bend in a substantlaily polarization-dependent manner, that is opposite said imbalance n TE and TM mode coupling, and offsets and compensates for said imbalance in TE and TM mode coupling, to realize light transmission from said trunk waveguide to said branch waveguide passing through said bend with a substantially reduced resultant or net polarization-dependent loss.

5. The planar optical waveguide tap according to claim 1, wherein said planar optical waveguide tap is comprised of optical materials having mismatched thermal expansion coefficients.

6. The planar optical waveguide tap according to claim 5, wherein said optical waveguide tap is comprised of silica disposed over a silicon substrate.

7. The planar optical waveguide tap according to claim 6, wherein said at least one predetermined bend has a radius of curvature of 2 mm to 3 mm.

8. The improvement according to claim 4, wherein said chip comprises silica on a silicon substrate, and wherein said predetermined bend has a pre-determined bend radius of 2 mm to 3 mm.

9. In a planar optical waveguide structure comprised of a first optical waveguide, having an input end into which light is launched, and supporting a first polarization and a second polarization of light passing therethrough from said input end, and a second optical waveguide having a coupling portion, that is adjacent and proximate to said first optical waveguide, and couples a portion of light passing through said first optical waveguide into said second optical waveguide in a first, substantially polarization-dependent manner, that causes light of said first polarization to be coupled more strongly into said second optical waveguide than light of said second polarization, so that light of said second polarization undergoes higher optical loss through said coupling portion than light of said first polarization, a method of compensating for said higher optical loss in said coupling portion of said second optical waveguide comprising the steps of:

(a) providing an optical waveguide bend of a prescribed size and shape that are effective to cause light to be transmitted through said optical waveguide bend in a second, substantially polarization-dependent manner, that is opposite to said first, substantially polarization-dependent manner, so that light of said second polarization couples more strongly through said optical waveguide bend than light of said first polarization, whereby light of said first polarization undergoes higher optical loss through said optical waveguide bend than light of said second polarization; and (b) coupling said optical waveguide bend with said second optical waveguide downstream of said coupling portion thereof, so as to cause light of said second polarization, that has been coupled from said first optical waveguide through said coupling portion of said second optical waveguide with higher optical loss than light of said first polarization, is coupled through said optical waveguide bend with lower optical loss than light of said first polarization, whereby light exiting said optical waveguide bend has said first, substantially polarization-dependent loss of said optical coupling portion compensated by said second, substantially polarization-dependent loss of said optical waveguide bend.

\* \* \* \* \*